Figure 1:
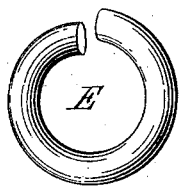

(No Model.)   2 Sheets—Sheet 1.

H. A. HARVEY.
WIDE RANGE YIELDING WASHER.

No. 385,621.   Patented July 3, 1888.

Witnesses:
Geo. H. Hiatt
A. M. Jones

Inventor:
Hayward A. Harvey,
Per Edw. E. Lunchy,
Atty.

(No Model.) 2 Sheets—Sheet 2.

H. A. HARVEY.
WIDE RANGE YIELDING WASHER.

No. 385,621. Patented July 3, 1888.

UNITED STATES PATENT OFFICE.

HAYWARD A. HARVEY, OF ORANGE, NEW JERSEY.

WIDE-RANGE YIELDING WASHER.

SPECIFICATION forming part of Letters Patent No. 385,621, dated July 3, 1888.

Application filed February 28, 1888. Serial No. 265,532. (No model.)

*To all whom it may concern:*

Be it known that I, HAYWARD A. HARVEY, of Orange, New Jersey, have invented certain Improvements in Wide-Range Yielding Washers, of which the following is a specification.

This invention consists of a soft-iron washer having the form of a single convolution of a spiral of coarse pitch. It is especially intended for employment in connection with railway track-bolts.

The application of a nut to a track-bolt now requires two operators—one to turn the nut home by means of a suitable wrench, and the other to press the head of the bolt against the plate through which the bolt is inserted, and to thereby hold the oval neck of the bolt in its seat, so that the bolt may not turn while the nut is being screwed home. By means of the present invention the track-bolt and the nut can be applied and the nut screwed home by a single operator. Usually the first one or two convolutions of the bolt-thread fit loosely in the nut, so that the nut can be started on the bolt by hand. The yielding spiral washer, having been slipped on the bolt, bears in one direction against the structure through which the bolt is inserted and in the other direction against the inner face of the nut. During the operation of screwing the nut home all parts of the washer are gradually compressed into the same plane. The resistance of the washer to such compression serves to keep the oval neck of the bolt in its seat and to hold the head of the bolt against the object through which the bolt extends.

Spring-washers having the form of a single convolution of a spiral are well known and in extensive use. Spring-washers, however, have necessarily a small range of yielding movement—so small that by the time they come into play the nut is so near home that there is no longer any chance for the dislodgment of the oval neck of the bolt from its seat, because the distance between the nut and the structure through which the bolt extends is less than the length of the oval part of the neck of the bolt. In the present case, on the contrary, the washer is so distended that it reaches from the structure through which the bolt extends to a nut which has only made one or two turns on the bolt. The range of yielding movement of the washer is intended to be about equal to the thickness of the nut in the direction of its axis. Owing to this wide range of yielding movement the washer is especially useful in connection with so-called "grip-bolts," in which the threads of the nut and bolt are relatively so differentiated, either in respective pitches or forms, that they are made to interfere during the operation of screwing home the nut. Such interference requires the application of strong force to turn the nut, and the maintenance of the oval neck of the bolt in its seat is therefore especially required, in order to prevent the bolt itself from turning.

Figure 2:
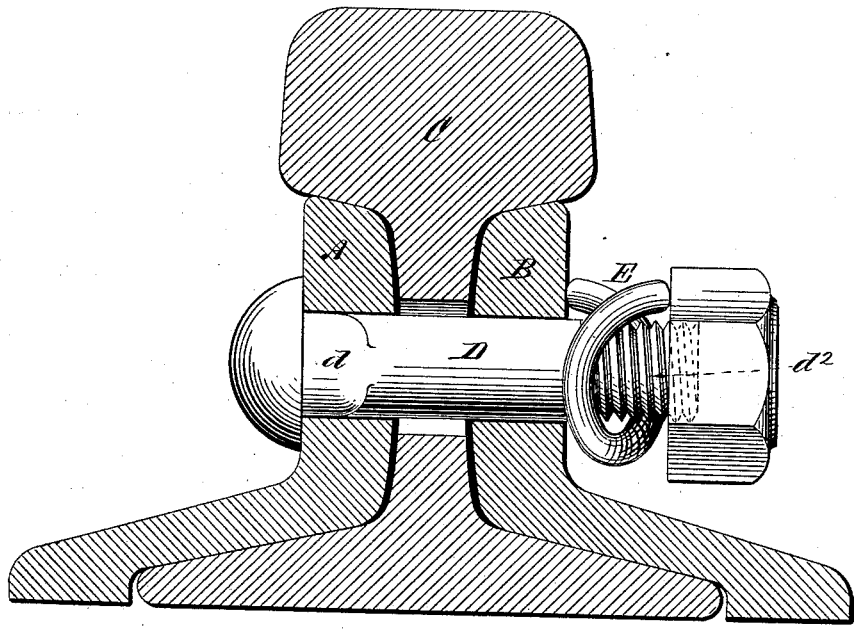
Figure 3:
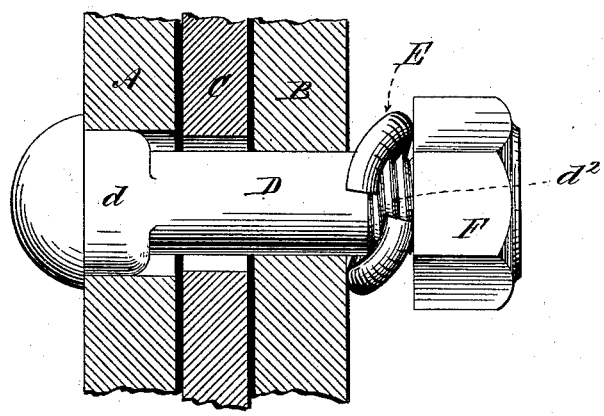
Figure 4:
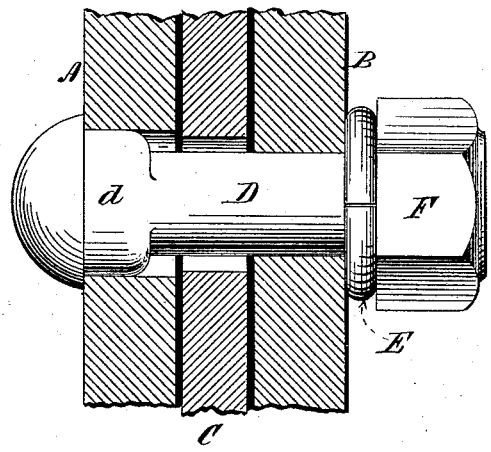

The accompanying drawings, illustrating the application of the invention to a railway track-bolt, are as follows:

Figure 1 is a perspective view of the washer. Fig. 2 is a transverse vertical section of a railway-joint, affording a view in elevation of a track-bolt and of a nut which has been started upon the end of the bolt, and showing a wide-range spiral washer embracing the bolt and interposed between the nut and the adjacent fish-plate. Fig. 3 is a horizontal section taken through the line $x\ x$ on Fig. 2, showing the nut screwed farther on the bolt, and illustrating the resulting compression of the washer in the direction of its axis. Fig. 4 is a view similar to Fig. 3, but showing the nut screwed home and all parts of the washer compressed into the same plane.

There is represented in the drawings a familiar form of railway-joint, composed of two fish-plates, A and B, arranged, respectively, on opposite sides of the rail C and perforated to admit the track-bolt D. The fish-plate A is provided with an oval perforation to receive the oval neck $d$ of the track-bolt.

The wide-range spiral washer E embraces the threaded part $d^2$ of the bolt, and when first applied is intended to bear in one direction against the surface of the fish-plate B and in the other direction against the surface of a nut, F, which has been started upon the end of the track-bolt, as shown in Fig. 2. As the operation of screwing home the nut progresses, the spiral washer E gradually yields in the direction of its axis, the resultant yielding of the washer due to the turning of the nut about half-way on the bolt being represented in Fig. 3. When the nut is screwed home, all parts of the washer E are compressed into the same plane, as illustrated in Fig. 4.

It will of course be understood that the spiral washer E may be made of any desired shape in cross section, its only essential requirements being that it shall have a suitably wide range of yielding movement and shall be made of a suitably soft metal, so that it will not break while being compressed from a spiral form into a circular form, in which all portions of it are brought into the same plane.

What is claimed as the invention is—

1. A soft-metal unresilient washer having the form of a single convolution of a spiral, the pitch of which is approximately equal to the inside diameter of the spiral, as and for the purpose set forth.

2. An oval-necked bolt and the structure through which the said bolt is inserted, in combination with a nut and a soft-metal washer having the form of a single convolution of a spiral of coarse pitch, and adapted to embrace the bolt and to bear in one direction against the structure through which the bolt is inserted and in the other direction against the nut, as and for the purpose set forth.

HAYWARD A. HARVEY.

Witnesses:
A. M. JONES,
R. W. ARMSTRONG.